United States Patent
Kim

(10) Patent No.: US 7,414,677 B2
(45) Date of Patent: Aug. 19, 2008

(54) APPARATUS AND METHOD FOR DRIVING IMAGE DISPLAY DEVICE USING DMD

(75) Inventor: Sung Min Kim, Daegoo-si (KR)

(73) Assignee: LG Electronics Inc., Seoul (KR)

( * ) Notice: Subject to any disclaimer, the term of this patent is extended or adjusted under 35 U.S.C. 154(b) by 543 days.

(21) Appl. No.: 11/052,918

(22) Filed: Feb. 9, 2005

(65) Prior Publication Data

US 2005/0179823 A1 Aug. 18, 2005

(30) Foreign Application Priority Data

Feb. 10, 2004 (KR) .................. 10-2004-0008682

(51) Int. Cl.
*H04N 9/12* (2006.01)
(52) U.S. Cl. .................................... 348/743
(58) Field of Classification Search .................. 348/743, 348/742, 771, 739, 268, 269, 270, 271, 68, 348/69, 70, 71
See application file for complete search history.

(56) References Cited

U.S. PATENT DOCUMENTS

| | | | | |
|---|---|---|---|---|
| 5,774,196 A | * | 6/1998 | Marshall | 348/743 |
| 6,054,832 A | * | 4/2000 | Kunzman et al. | 318/600 |
| 6,324,006 B1 | * | 11/2001 | Morgan | 359/618 |
| 7,139,040 B2 | * | 11/2006 | Marshall | 348/743 |
| 7,253,794 B2 | * | 8/2007 | Wood | 345/84 |
| 2001/0043289 A1 | | 11/2001 | Marshall | |

* cited by examiner

*Primary Examiner*—Paulos M Natnael
(74) *Attorney, Agent, or Firm*—Birch, Stewart, Kolasch & Birch, LLP

(57) ABSTRACT

An apparatus and method for driving an image display device using a DMD are provided. The apparatus includes a color wheel, an optical sensor, a delay time determining unit, and a control unit. The color wheel includes a plurality of color filters and index marks formed at positions corresponding to boundary lines between the color filters, and the optical sensor detects the index marks during rotation of the color wheel and outputs detection signals. The delay time determining unit determines a delay time corresponding to a minimum margin required in a conversion of a color image signal according to the detection signal inputted from the optical sensor, and the control unit controls a DMD based on the detection signals and the delay time.

20 Claims, 4 Drawing Sheets

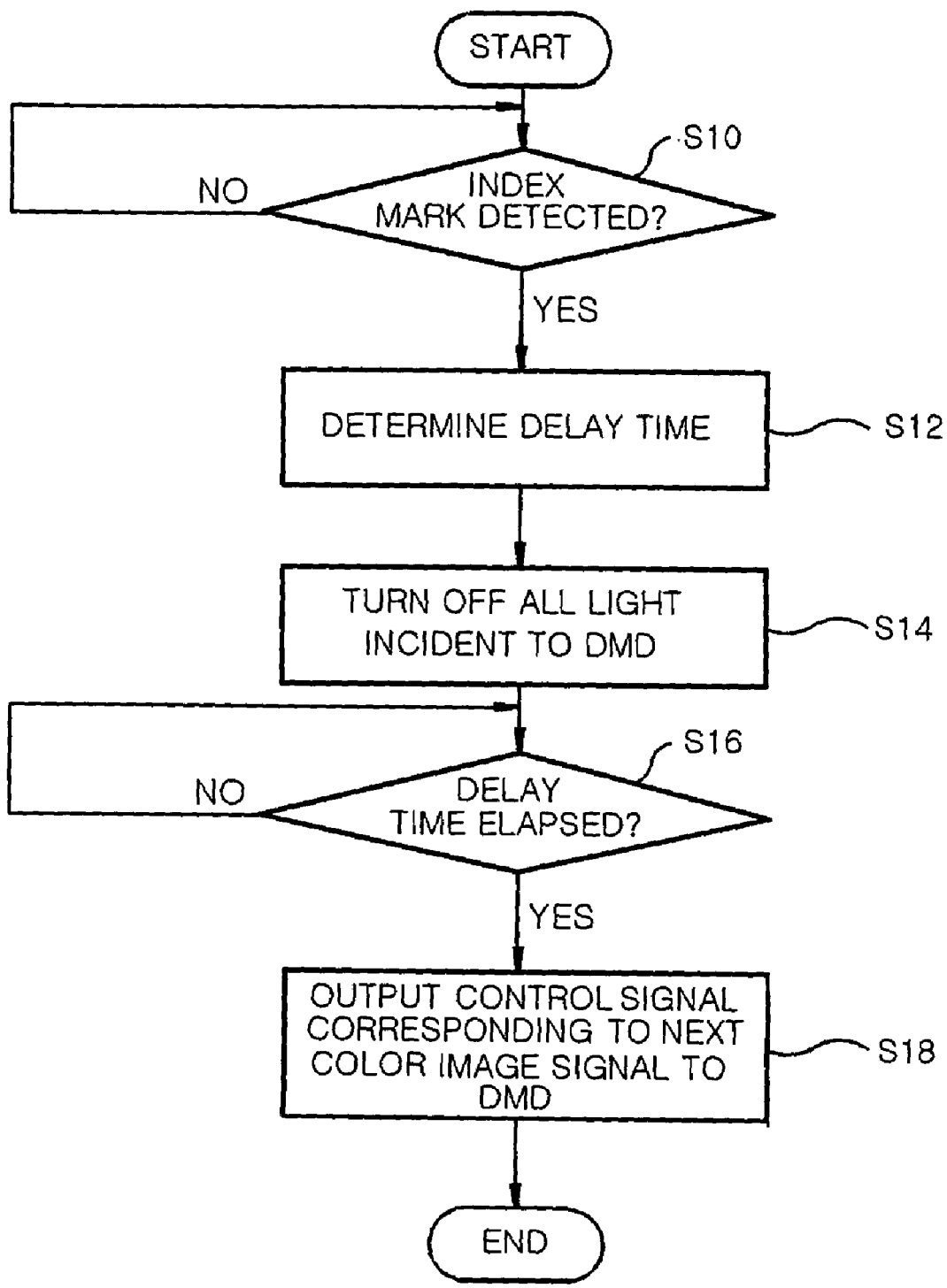

APPARATUS AND METHOD FOR DRIVING IMAGE DISPLAY DEVICE USING DMD

BACKGROUND OF THE INVENTION

1. Field of the Invention

The present invention relates to an apparatus and method for driving an image display device using a DMD, and more particularly, to an apparatus and method for driving an image display device using a DMD, in which a margin of a light mute region at a color change can be minimized by correctly detecting a timing in a change of a color filter during rotation of a color wheel employed in a projection-type image display device using a DMD.

2. Description of the Related Art

Recently, with the advance of information industries, image display devices capable of displaying a large-sized image are in great demand. One of them is a projection-type image display device. A digital light processing (DLP) projector and a DLP projection TV using a digital micromirror device (DMD) are spotlighted.

FIGS. 1 and 2 are views of a color wheel used in a related art DLP projector or DLP projection TV.

Referring to FIGS. 1 and 2, the color wheel 10 has two RGB color filters. The color wheel 10 rotates at a predetermined frequency and separates a white light incident from a lamp 20 into R, G and B colors. Then, the R, G and B colors are provided to a DMD 30.

Light incident to the DMD 30 through the color wheel 10 is selectively reflected to a projection lens or a light absorber by a plurality of micromirrors included in the DMD 30, such that an image is displayed on a screen.

As the color wheel 10 rotates, a timing of R, G and B color change occurring when passing through the RGB color filters must be synchronized with a driving signal of the micromirror, which is supplied to the DMD 30.

For this purpose, an index mark 12 is provided at a central cylinder and indicates a rotation reference position of the color wheel 10.

Accordingly, during the rotation of the color wheel 10, an optical sensor detects the index mark 12 and checks whether or not the color wheel 10 rotates at a constant speed.

Meanwhile, since one index mark 12 is used to check the rotation state of the color wheel 10, it is impossible to accurately know the timing in a change of the color filter (boundary positions of the R, G and B color filters).

Therefore, the timing in the change of the color filter is estimated through an arithmetic operation, based on the position of the index mark 12. Then, the light is turned off during a margin period before and after the estimated timing, so that a light mute region cannot be displayed.

At this point, the light can be turned off by reflecting all incident light to the light absorber by setting an angle of the micromirror of the DMD 30 to −10° C.

FIG. 3 illustrates a phase relationship between a change of the R, G and B color filters and R, G and B images actually displayed during the rotation of the related art color wheel.

FIG. 3(A) illustrates a phase change of the R, G and B color filters during the rotation of the color wheel, and FIG. 3(B) illustrates a phase of the R, G and B images actually displayed.

As shown in FIG. 3(B), a predetermined margin period M exists before and after time points when the R, G and B color filters change.

The margin period M is set to be sufficiently large based on the arithmetic operation with reference to the index mark 12. The reason is that it is impossible to accurately know the timing in the change of the color filters.

However, when the margin period M is set to be large, the light is not displayed during that period. Therefore, the use efficiency of the light is degraded and thus an entire brightness of the DLP projector or the DLP projection TV is lowered.

Also, the unused light is scattered and is changed into heat within the DLP system or projected on a screen, thus generating noise.

SUMMARY OF THE INVENTION

Accordingly, the present invention is directed to an apparatus and method for driving an image display device that substantially obviate one or more problems due to limitations and disadvantages of the related art.

An object of the present invention is to provide an apparatus and method for driving an image display device using a DMD, in which a margin of a light mute region can be minimized by accurately detecting a timing of a color change during a rotation of a color wheel.

Also, another object of the present invention is to increase a use efficiency of light and improve a brightness of a projection-type image display.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for driving an image display device using a DMD includes: a color wheel including a plurality of color filters and index marks formed at positions corresponding to boundary lines between the color filters; an optical sensor for detecting the index marks during rotation of the color wheel and outputting detection signals; a delay time determining unit for determining a delay time corresponding to a minimum margin required in a conversion of a color image signal according to the detection signal inputted from the optical sensor; and a control unit for controlling a DMD based on the detection signals and the delay time.

In another aspect of the present invention, an apparatus for driving an image display device using a DMD includes: a color wheel including a plurality of color filters and index marks for indicating color change boundaries of the plurality of color filters, the color filters including RGB color filters; an optical sensor for detecting the index marks during rotation of the color wheel and outputting detection signals, each of which has a start portion, a middle portion and an end portion; a delay time determining unit for determining a delay time required in a conversion of a color image signal with reference to the detection signals inputted from the optical sensor; and a control unit for controlling a DMD based on the detection signals and the delay time.

In a further another aspect of the present invention, a method for driving an image display device using a DMD includes the steps of: rotating a color wheel, the color wheel including a plurality of color filters and index marks formed at positions corresponding to boundaries between the color filters; detecting the index marks during rotation of the color wheel and outputting detection signals; determining a delay time required in a conversion of a color image signal based on the detection signals; and controlling a DMD based on the detection signals and the delay time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a flowchart illustrating a method for driving an image display device using a DMD according to an embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
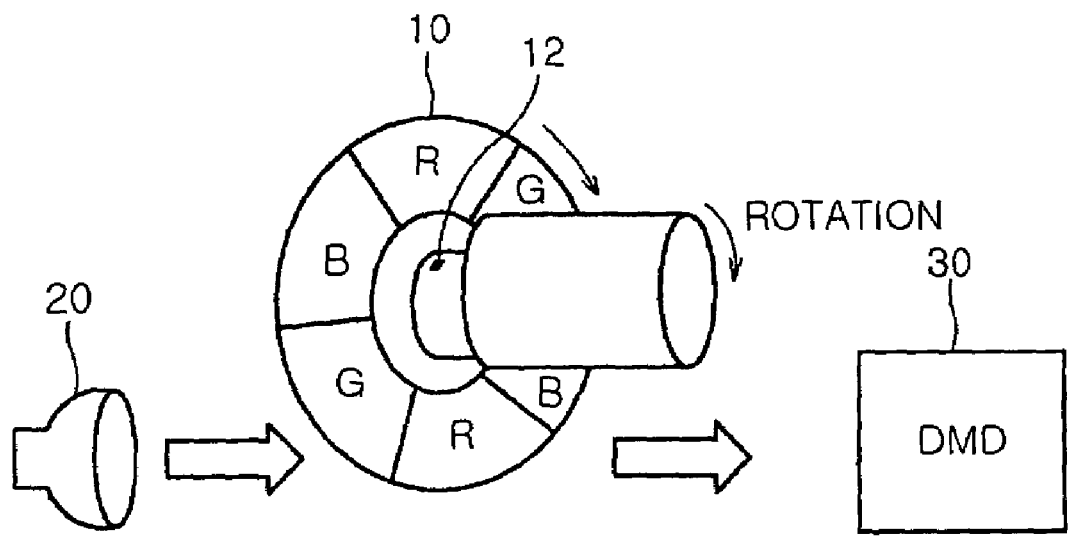
FIGS. 1 and 2 are views of a color wheel used in a related art DLP projector or DLP projection TV.
Figure 2:
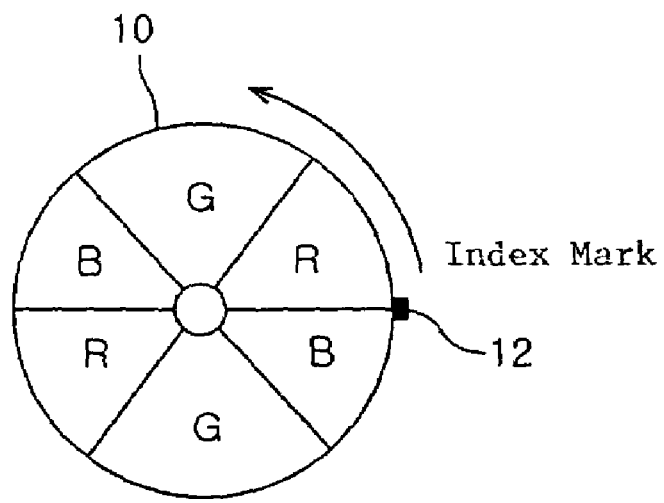
Figure 3:
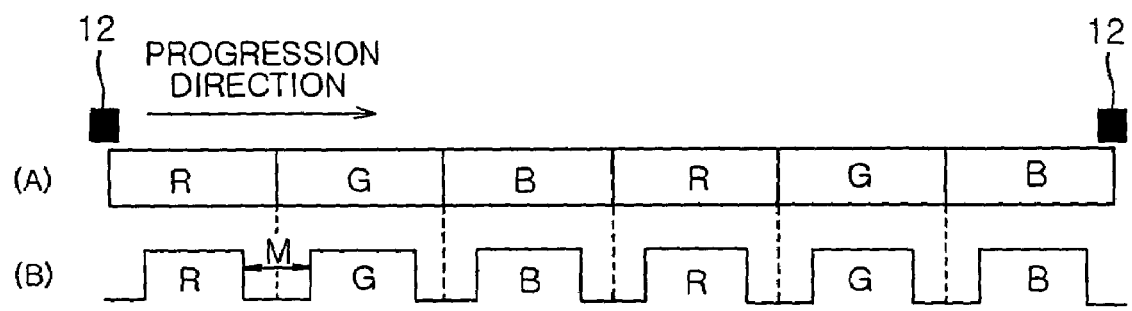
FIG. 3 illustrates a phase relationship between a change of the R, G and B color filters and R, G and B images actually displayed during the rotation of a related art color wheel.
Figure 4:
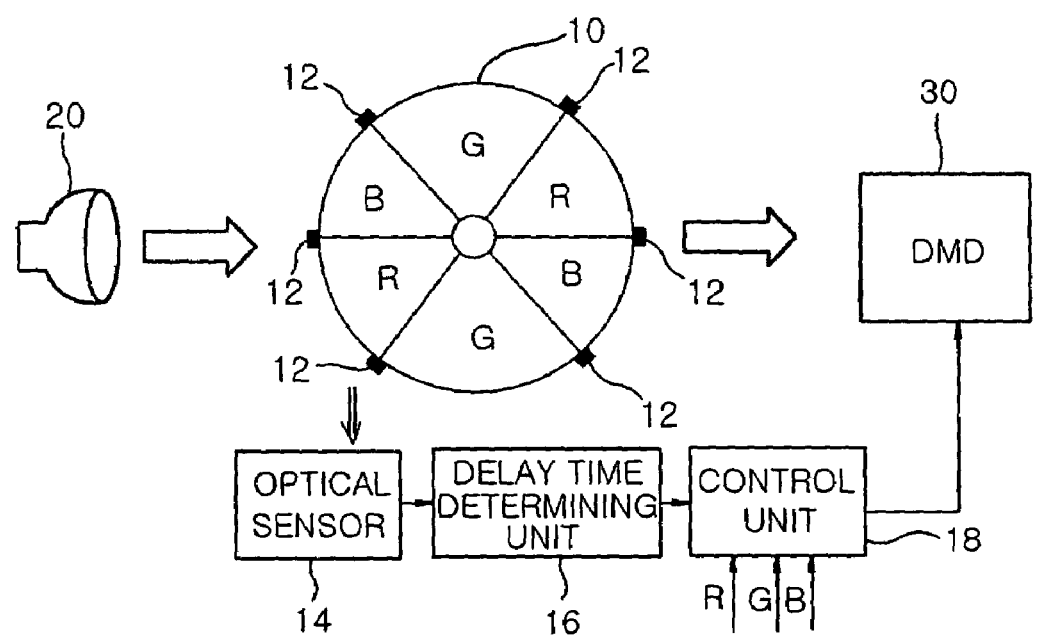
FIGS. 4 and 5 are views of an apparatus for driving an image display device using a DMD according to an embodiment of the present invention.
Figure 5:
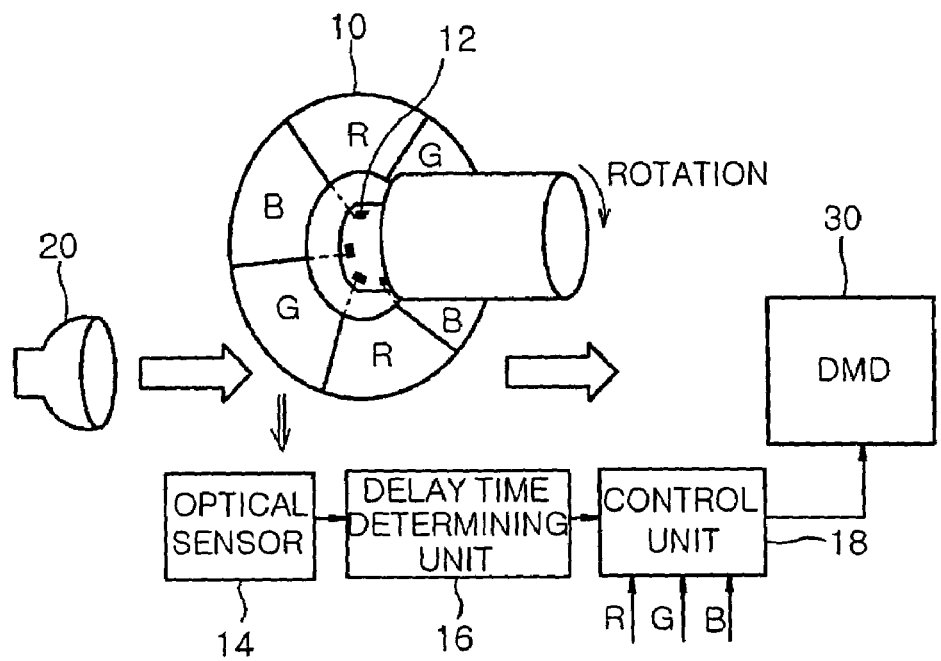
Figure 6:
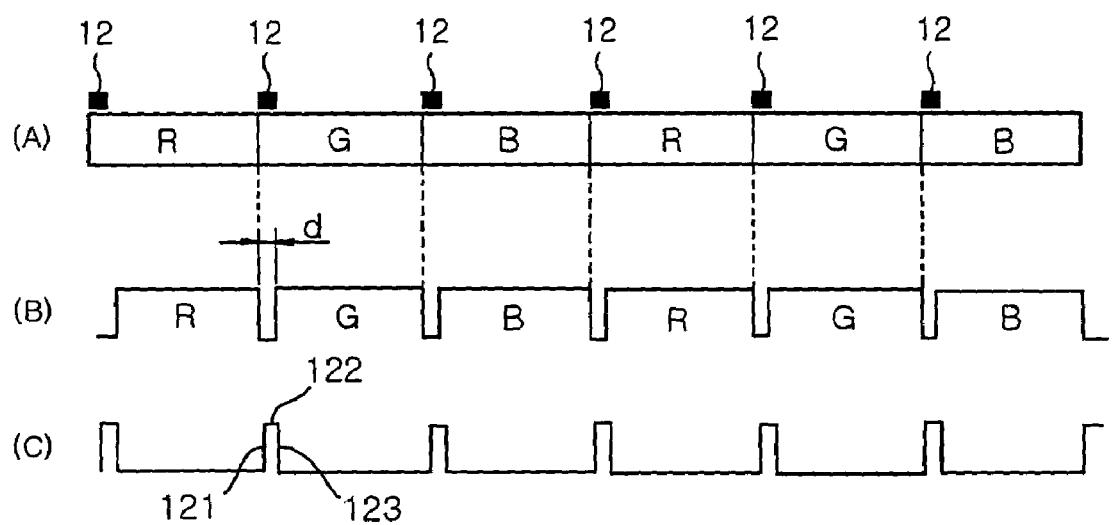
FIG. 6 illustrates a phase relationship between a change of the R, G and B color filters and R, G and B images actually displayed during the rotation of a color wheel in the apparatus for driving an image display device using a DMD according to an embodiment of the present invention.

FIGS. 4 and 5 are views of an apparatus for driving an image display device using a DMD according to an embodiment of the present invention, and FIG. 6 illustrates a phase relationship between a change of the R, G and B color filters and R, G and B images actually displayed during the rotation of a color wheel in the apparatus for driving an image display device according to an embodiment of the present invention.

Referring to FIGS. 4 to 6, the apparatus for driving the image display device using the DMD includes a color wheel 10, an optical sensor 14, a delay time determining unit 16, and a control unit 18. The color wheel 10 includes two RGB color filters and six index marks 12 disposed at portions corresponding to boundary lines between the color filters. The optical sensor 14 detects the index marks 12 during the rotation of the color wheel 10 and outputs detection signals. The delay time determining unit 16 determines a delay time d corresponding to a minimum margin required in conversion of color image signals according to the detection signals. Based on the detection signals and the delay time d, the control unit 18 turns off micromirrors of the DMD 30 during a period from the detection of the index marks to the delay time d, such that all incident light is reflected to a light absorber. Then, the control unit 18 turns on the DMD 30 after the delay time d, such that an image corresponding to a next color image signal is displayed.

Although the color wheel 10 having two RGB color filters and six index marks 12 is shown in FIGS. 4 to 6, the color wheel can also include one RGB color filter and three index marks.

According to another embodiment of the present invention, the color wheel 10 can further include a dark green color filter and a white color filter, in addition to the RGB color filters.

It is preferable that the delay time d is a minimum time required when the DMD 30 converts the color image signal. The delay time d may be changed depending on a rotating speed of the color wheel 10, the number of the color filters, and so on.

FIG. 6(A) illustrates phases of the RGB color filters during the rotation of the color wheel, FIG. 6(B) illustrates a change of an image displayed on an actual screen, and FIG. 6(C) illustrates an example of an index mark detection signal.

In FIG. 6(A), the index marks 12 are detected at every change of the RGB color filters and the DMD 30 is turned off during a period from the detection of the index mark 12 to the delay time d. When the DMD 30 is turned off, an angle of the micromirror of the DMD 30 becomes −10° C., such that the incident light is reflected to the light absorber.

According to the present invention, the change of the RGB color filters can be accurately detected from the index marks 12. Therefore, the delay time d can be set as the minimum time required in the conversion of the color image signal. Consequently, the delay time d can be greatly shortened compared with the related art.

The index marks 12 are formed at positions corresponding to the boundary lines where the RGB color filters are changed. That is, the index marks 12 are formed at the central cylinder of the color wheel 10, and the position where the color wheel 10 is formed corresponds to the boundary lines where the RGB color filters are changed.

Here, the index mark detection signal outputted from the optical sensor 14 includes a start portion 121, a middle portion 122 and an end portion 122. One of the three portions 121, 122 and 123 can be set to indicate the boundary lines where the RGB color filters are changed.

FIG. 7 is a flowchart illustrating a method for driving the image display device using the DMD according to an embodiment of the present invention.

Referring to FIG. 7, the optical sensor detects the index mark during the rotation of the color wheel (S10).

If the index mark is detected by the optical sensor, the delay time determining unit determines the delay time d corresponding to the minimum margin required in the conversion of the color image signal, and then turns off the DMD during a period from the detection of the index mark to the delay time d (S12, S14). That is, an angle of the micromirror of the DMD is set to be −10° C., such that all incident light is reflected to the light absorber. Consequently, the light is not incident to the projection lens.

Then, it is checked whether or not the delay time d elapses from the detection of the index mark (S16). If it is checked that the delay time d elapses, the DMD is turned on so that an image corresponding to a next color image signal can be displayed (S18)

According to the present invention, the timing in the change of the color filters can be accurately detected and thus the margin of the light mute region occurring in the conversion of the color image signal can be minimized.

In addition, since an amount of light scattered internally is decreased, the probability that can generate an internal heat and a screen noise is reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for driving an image display device using a DMD, the apparatus comprising:
   a color wheel including a plurality of color filters and index marks formed at positions corresponding to boundary lines between the color filters and detected at every change of the color filters;
   an optical sensor for detecting the index marks during rotation of the color wheel and outputting detection signals;
   a delay time determining unit for determining a delay time corresponding to a minimum margin required in a conversion of a color image signal according to the detection signal inputted from the optical sensor; and
   a control unit for controlling a DMD based on the detection signals and the delay time.

2. The apparatus according to claim 1, wherein the plurality of color filters include two pairs of RGB color filters.

3. The apparatus according to claim 1, wherein the plurality of color filters include one pair of RGB color filters.

4. The apparatus according to claim 1, wherein the plurality of color filters include RGB color filters and a dark green color filter.

5. The apparatus according to claim 1, wherein the plurality of color filters includes RGB color filters and a white color filter.

6. The apparatus according to claim 1, wherein the control unit turns off the DMD during a period from the detection of the index mark to the delay time, and turns on the DMD after the delay time.

7. An apparatus for driving an image display device using a DMD, the apparatus comprising:
   a color wheel including a plurality of color filters and index marks for indicating color change boundaries of the plurality of color filters and being detected at every change of the color filters, the color filters including RGB color filters;
   an optical sensor for detecting the index marks during rotation of the color wheel and outputting detection signals, each of which has a start portion, a middle portion and an end portion;
   a delay time determining unit for determining a delay time required in a conversion of a color image signal with reference to the detection signals inputted from the optical sensor; and
   a control unit for controlling a DMD based on the detection signals and the delay time.

8. The apparatus according to claim 7, wherein the plurality of color filters include two pairs of RGB color filters.

9. The apparatus according to claim 7, wherein the plurality of color filters include RGB color filters and a dark green color filter.

10. The apparatus according to claim 7, wherein the plurality of color filters includes RGB color filters and a white color filter.

11. The apparatus according to claim 7, wherein the control unit turns off the DMD during a period from the detection of the index mark to the delay time, and turns on the DMD after the delay time.

12. The apparatus according to claim 7, wherein the delay time determining unit determines the delay time with reference to the start portion of the detection signal.

13. The apparatus according to claim 7, wherein the delay time determining unit determines the delay time with reference to the middle portion of the detection signal.

14. The apparatus according to claim 7, wherein the delay time determining unit determines the delay time with reference to the end portion of the detection signal.

15. A method for driving an image display device using a DMD, the method comprising the steps of:
   rotating a color wheel, the color wheel including a plurality of color filters and index marks formed at positions corresponding to boundaries between the color filters and detected at every change of the color filters;
   detecting the index marks during rotation of the color wheel and outputting detection signals;
   determining a delay time required in a conversion of a color image signal based on the detection signals; and
   controlling a DMD based on the detection signals and the delay time.

16. The method according to claim 15, wherein the plurality of color filters include two pairs of RGB color filters.

17. The method according to claim 15, wherein the plurality of color filters include RGB color filters and a dark green color filter.

18. The method according to claim 15, wherein the plurality of color filters includes RGB color filters and a white color filter.

19. The method according to claim 15, wherein the DMD is turned off during a period from the detection of the index mark to the delay time, and turned on the DMD after the delay time.

20. The method according to claim 15, wherein the delay time is determined with reference to one of a start portion, a middle portion and an end portion of the detection signal.

* * * * *